US008541754B2

(12) United States Patent
Takenaka et al.

(10) Patent No.: US 8,541,754 B2
(45) Date of Patent: Sep. 24, 2013

(54) IMAGING SYSTEM, IMAGE PROCESSING METHOD THEREFOR, AND PROGRAM THEREFOR

(75) Inventors: Katsuro Takenaka, Honjo (JP); Tadao Endo, Honjo (JP); Toshio Kameshima, Kumagaya (JP); Masayoshi Akiyama, Yokohama (JP); Tomoyuki Yagi, Honjo (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/390,592

(22) PCT Filed: Aug. 25, 2010

(86) PCT No.: PCT/JP2010/005231
§ 371 (c)(1),
(2), (4) Date: Feb. 15, 2012

(87) PCT Pub. No.: WO2011/024448
PCT Pub. Date: Mar. 3, 2011

(65) Prior Publication Data
US 2012/0138811 A1    Jun. 7, 2012

(30) Foreign Application Priority Data

Aug. 26, 2009   (JP) ................................. 2009-195698

(51) Int. Cl.
*G01T 1/17*    (2006.01)
(52) U.S. Cl.
USPC ......................................... 250/394; 250/395
(58) Field of Classification Search
USPC ....................................................... 250/394
See application file for complete search history.

(56) References Cited

U.S. PATENT DOCUMENTS

| | | | |
|---|---|---|---|
| 5,920,070 A * | 7/1999 | Petrick et al. ............ | 250/370.09 |
| 2004/0096036 A1 * | 5/2004 | Yanoff et al. ................ | 378/98.8 |
| 2004/0217294 A1 * | 11/2004 | Zur ........................... | 250/370.09 |
| 2004/0218729 A1 | 11/2004 | Xue et al. | |
| 2006/0180768 A1 * | 8/2006 | Bogdanovich et al. .. | 250/370.09 |

FOREIGN PATENT DOCUMENTS

| | | |
|---|---|---|
| JP | 11128213 A | 5/1999 |
| JP | 2004020300 A | 1/2004 |
| JP | 2006239117 A | 9/2006 |
| JP | 2007215760 A | 8/2007 |
| JP | 2008029393 A | 2/2008 |
| JP | 2008167846 A | 7/2008 |

* cited by examiner

*Primary Examiner* — Marcus Taningco
(74) *Attorney, Agent, or Firm* — Canon U.S.A., Inc. IP Division

(57) ABSTRACT

An imaging system includes a detector (104) having a first area where irradiation occurs in a radiation field (A) and a second area other than the first area where irradiation occurs in a radiation field (B) and configured to output image data, and an image processing unit (601) that performs image processing on the image data. The image processing unit (601) includes a storage unit (602) that stores dark output information, a measurement unit (607) that measures the integral dose of the radiation or light applied to a pixel in the first area and the integral dose of the radiation or light applied to a pixel in the second area, and a correction unit (610) that corrects the image data, based on the dark output information obtained from the storage unit (602) and the integral doses measured by the measurement unit (607), when changing of the radiation field has occurred.

7 Claims, 15 Drawing Sheets

| INTEGRAL DOSE (INTEGRAL RADIATION DOSE) | CORRECTION AMOUNT |
|---|---|
| 100 | 10 |
| 200 | 7 |
| 300 | 5 |
| . | . |
| . | . |

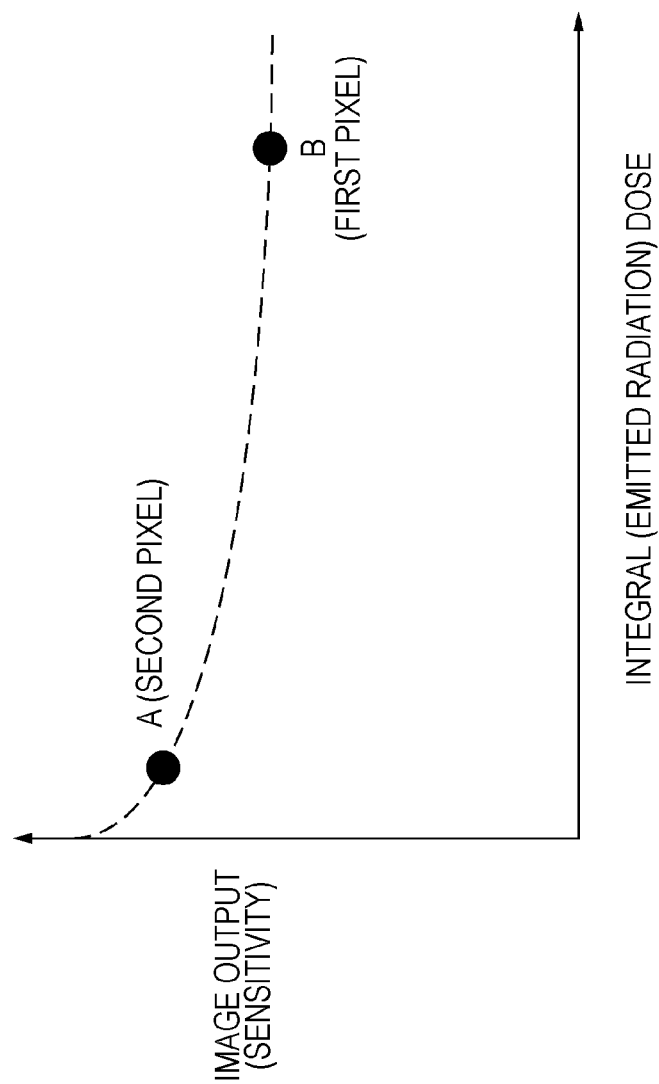

US 8,541,754 B2

IMAGING SYSTEM, IMAGE PROCESSING METHOD THEREFOR, AND PROGRAM THEREFOR

TECHNICAL FIELD

The present invention relates to an imaging apparatus, an image processing method therefor, and a program therefor. More specifically, the present invention relates to an imaging apparatus used in an imaging system, an image processing method therefor, and a program therefor, which is suitable for use in still image radiography such as general radiography or moving image radiography such as fluoroscopic radiography in medical diagnosis. In the present invention, radiation includes beams of particles (including photons) emitted by radioactive decay, such as alpha rays, beta rays, and gamma rays, and beams having energy higher than or equal to that of the above rays, such as X-rays, particle beams, and cosmic rays.

BACKGROUND ART

In recent years, radiographic imaging apparatuses including a flat panel detector (hereinafter abbreviated as FPD) formed of a semiconductor material have begun to be put into practice as radiographic apparatuses used for X-ray medical diagnostic imaging or non-destructive inspection. Such radiographic imaging apparatuses are used as, for example, in medical diagnostic imaging, digital imaging apparatuses for use in still image radiography such as general radiography or moving image radiography such as fluoroscopic radiography.

In fluoroscopic radiography using a digital imaging apparatus, a method and apparatus disclosed in PTL 1 for processing a fluoroscopic image are available. In the method and apparatus disclosed in PTL 1, a lag (afterimage) prediction model is generated by generating at least two dark images after scanning an object being examined, the object being examined is scanned, and the lag prediction model is periodically updated during the scan.

Further, the capabilities of the above radiographic imaging apparatuses to switch between an area (field-of-view size) that is read by an FPD and a radiation area of X-rays have been studied. However, in a case where switching is performed so as to increase the radiation area, the sensitivity or dark output of pixels differs between the irradiated area and the non-irradiated area of the FPD. Thus, an obtained image may contain a ghost (image step) that is affected by the radiation area, leading to reduced quality of the image. In PTL 2, an examination is made of performing image processing to correct for such a ghost or the like that is affected by the radiation area. Specifically, ghost correction coefficients are obtained for each X-ray irradiation condition on the basis of data that includes a ghost and that is obtained by uniform irradiation. From the obtained ghost correction coefficients, a required ghost correction coefficient corresponding to X-ray irradiation conditions for collecting data regarding the part being examined, which is the radiation area, and corresponding to the time taken from the start of X-ray irradiation is obtained. Thus, the data regarding the part being examined is corrected using the required ghost correction coefficient, and corrected image data is generated.

CITATION LIST

Patent Literature

PTL 1: U.S. Patent Application Publication No. 2004/0218729
PTL 2: Japanese Patent Laid-Open No. 2008-167846

SUMMARY OF INVENTION

Technical Problem

In the correction technique disclosed in PTL 2, a correction coefficient may be determined using data that includes a ghost and that is obtained by uniform irradiation, that is, sensitivity data, but correction based on the amount of afterimage included in an image signal obtained from the FPD, which may cause a ghost, may not be feasible. Therefore, it may be difficult to generate and process sufficiently corrected image data. Furthermore, during switching of the radiation area, as disclosed in PTL 1, if a lag (afterimage) prediction model is created by creating at least two dark images after scanning the object being examined, and is updated, some time may be required to start the radiation of X-rays after the switching.

Solution to Problem

As a result of intensive studies to provide an imaging system that addresses changing of the radiation area without reducing the quality of an image and that requires only a short time for switching of the radiation field, the inventor of the present invention has achieved the following aspects of the invention.

An aspect of the present invention provides a radiographic imaging system including a detector that includes a plurality of pixels each having a conversion element configured to convert radiation or light into electric charge and that is configured to output image data corresponding to applied radiation or light, and an image processing unit configured to perform image processing on the image data. The detector has a first area where irradiation occurs in a first radiation field, and a second area other than the first area where irradiation occurs in a second radiation field larger than the first radiation field. The image processing unit includes a storage unit configured to store dark output information that is based on an integral dose of the radiation or light and dark output characteristics of the pixels, a measurement unit configured to measure a first integral dose that is an integral dose of radiation or light with which a first pixel included in the first area is irradiated, and a second integral dose that is an integral dose of radiation or light with which a second pixel included in the second area is irradiated, and a correction unit configured to correct, based on the dark output information obtained from the storage unit and the first integral dose and second integral dose measured by the measurement unit, at least one of data of the first pixel and data of the second pixel within the image data when switching from the first radiation field to the second radiation field has occurred.

Another aspect of the present invention provides an image processing method for performing image processing on image data that corresponds to applied radiation or light and that is output from a detector including a plurality of pixels each having a conversion element configured to convert radiation or light into electric charge, the image processing method including measuring a first integral dose and a second integral dose, the first integral dose being an integral dose of radiation or light with which a first pixel included in a first area is irradiated, the first area being an area in the detector where the radiation or light is applied in a first radiation field, the second integral dose being an integral dose of radiation or light with which a second pixel included in a second area is irradiated, the second area being an area other than the first area in the detector where the radiation or light is applied in a second radiation field larger than the first radiation field; and when changing of a radiation field has occurred, correcting at least one of data of the first pixel and data of the second pixel within the image data, based on an integral dose of the radiation or light, dark output information that is obtained in advance and that is based on dark output characteristics of the pixels, and the measured first integral dose and second integral dose.

Still another aspect of the present invention provides a program for causing a computer to execute image processing on image data that corresponds to applied radiation or light and that is output from a detector including a plurality of pixels each having a conversion element configured to convert radiation or light into electric charge, the program causing the computer to execute the steps of measuring a first integral dose and a second integral dose, the first integral dose being an integral dose of radiation or light with which a first pixel included in a first area is irradiated, the first area being an area in the detector where the radiation or light is applied in a first radiation field, the second integral dose being an integral dose of radiation or light with which a second pixel included in a second area is irradiated, the second area being an area other than the first area in the detector where the radiation or light is applied in a second radiation field larger than the first radiation field; and when changing of a radiation field has occurred, correcting at least one of data of the first pixel and data of the second pixel within the image data, based on an integral dose of the radiation or light, dark output information that is obtained in advance and that is based on dark output characteristics of the pixels, and the measured first integral dose and second integral dose.

Advantageous Effects of Invention

According to the present invention, there can be provided an imaging apparatus and system that reduce ghosting (image step) affected by a radiation area and that require only a short time for switching of the radiation field in accordance with changing of a radiation area without reducing the quality of an image.

BRIEF DESCRIPTION OF DRAWINGS

FIG. 8A is an integral dose versus image output characteristic diagram describing another concept and advantages of the present invention.

DESCRIPTION OF EMBODIMENTS

Embodiments of the present invention will be described in detail hereinafter with reference to the drawings.

First Embodiment

Figure 1:
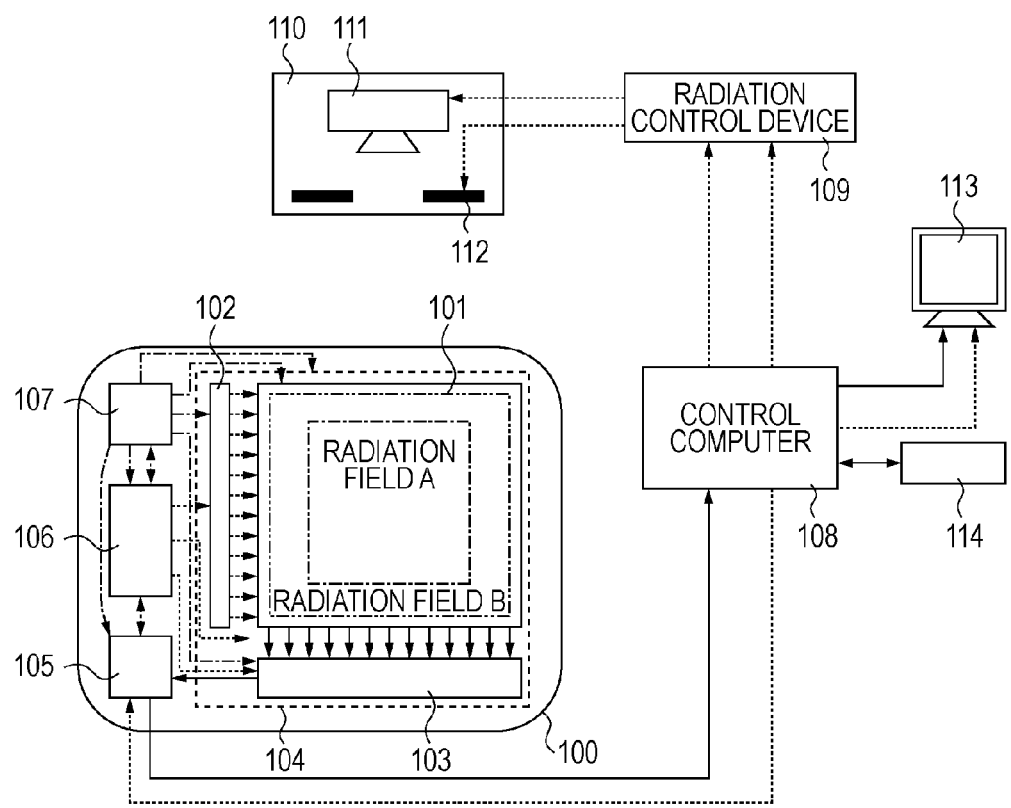
FIG. 1 is a conceptual block diagram of an imaging system including an imaging apparatus according to the present invention.

Referring to FIG. 1, a radiographic imaging system according to an embodiment of the present invention includes an imaging apparatus 100, a control computer 108, a radiation control device 109, a radiation generating device 110, a display device 113, and a console 114. The imaging apparatus 100 includes a flat panel detector (FPD) 104. The FPD 104 includes a detection unit 101 having a plurality of pixels that convert radiation or light into electrical signals, a drive circuit 102 that drives the detection unit 101, and a read circuit 103 that outputs the electrical signals from the driven detection unit 101 as image data. The imaging apparatus 100 further includes a signal processing unit 105 that processes the image data from the FPD 104 and that outputs the processed image data, a control unit 106 that controls the operation of the FPD 104 by supplying a control signal to each constituent element, and a power supply unit 107 that supplies a bias to each constituent element. The signal processing unit 105 receives a control signal from the control computer 108, which will be described below, and provides the control unit 106 with the control signal. Further, the signal processing unit 105 receives image data from the read circuit 103, and performs a correction process described below, and corrected image data is output from the imaging apparatus 100. The power supply unit 107 includes a power supply circuit such as a regulator configured to receive a voltage from an external power source (not illustrated) or a built-in battery (not illustrated) and to supply voltages required for the detection unit 101, the drive circuit 102, and the read circuit 103.

The control computer 108 provides synchronization between the radiation generating device 110 and the imaging apparatus 100, transmits a control signal for determining the state of the imaging apparatus 100, and performs image processing on image data from the imaging apparatus 100 for correction, storage, or display. The control computer 108 further transmits a control signal for determining irradiation conditions of radiation on the basis of information from the console 114 to the radiation control device 109.

In response to a control signal from the control computer 108, the radiation control device 109 controls the operation for emitting radiation from the radiation source 111 included in the radiation generating device 110 or the operation of a radiation field aperture mechanism 112. The radiation field aperture mechanism 112 has a function capable of changing a given radiation field that is an irradiated area in the detection unit 101 of the FPD 104 where radiation or light corresponding to the radiation is applied. In the embodiment, the radiation field aperture mechanism 112 has a function capable of switching between a radiation field A and a radiation field B. In the radiation field A, which corresponds to a first radiation field in the present invention, radiation corresponding to some pixels included in the plurality of pixels, for example, pixels of approximately 1000 rows by approximately 1000 columns when the total number of pixels is approximately 2800 rows by approximately 2800 columns, is applied. Further, in the radiation field B, which corresponds to a second radiation field in the present invention, radiation corresponding to an area larger than the radiation field A, for example, all the pixels, is applied. The console 114 is configured to input information about the object being examined or radiographic conditions as parameters for allowing the control computer 108 to perform various types of control, and transmits the input parameters to the control computer 108. The display device 113 displays the image data subjected to image processing by the control computer 108.

Next, an imaging apparatus according to a first embodiment of the present invention will be described with reference to FIG. 2. Elements having the same or similar configurations as or to those described with reference to FIG. 1 are assigned the same numerals, and the detailed descriptions thereof are omitted. Further, in FIG. 2, an imaging apparatus including an FPD having pixels of three rows by three columns is illustrated for ease of description. In actuality, however, an imaging apparatus has a larger number of pixels. For example, a 17-inch imaging apparatus has pixels of approximately 2800 rows by approximately 2800 columns.

The detection unit 101 has a plurality of pixels arranged in a matrix. Each of the pixels has a conversion element 201 that converts radiation or light into electric charge, and a switching element 202 that outputs an electrical signal corresponding to the electric charge. In the embodiment, a photoelectric conversion element that converts light impinging on the conversion element 201 into electric charge may be implemented using a PIN-type photodiode containing amorphous silicon as a main component, which is disposed on an insulating substrate such as a glass substrate. Examples of the conversion element 201 may include an indirect-type conversion element provided with a wavelength converter on the radiation incident side of the above photoelectric conversion element, which converts radiation into light of a wavelength band detectable by the photoelectric conversion element, and a direct-type conversion element that converts radiation directly into electric charge. Examples of the switching element 202 may include a transistor having a control terminal and two main terminals. In the embodiment, a thin film transistor (TFT) may be used. The conversion elements 201 have first electrodes that are electrically connected to first main terminals of the main terminals of the switching elements 202, and second electrodes that are electrically connected to a bias power supply 107a via a common bias line Bs. A plurality of switching elements in the row direction, for example, switching elements T11, T12, and T13, have control terminals that are commonly electrically connected to a drive line G1 in the first row. Drive signals for controlling the conductive state of the switching elements are applied from the drive circuit 102 via drive lines on a row-by-row basis. Second main terminals of a plurality of switching elements in the column direction, for example, switching elements T11, T21, and T31, are electrically connected to a signal line Sig1 in the first column, and electrical signals corresponding to the electric charge of conversion elements S11, S21, and S31 are output to the read circuit 103 via the signal line Sig1 during a period during which the switching elements T11, T21, and T31 are in a conductive state. Signal lines Sig1 to Sig3 arranged in the column direction carry the electrical signals output from the plurality of pixels to the read circuit 103 in parallel.

The read circuit 103 includes amplifier circuits 207 that amplify the electrical signals output in parallel from the detection unit 101, and the amplifier circuits 207 are provided in correspondence with the respective signal lines. Each of the amplifier circuits 207 includes an integrating amplifier 203 that amplifies an output electrical signal, a variable amplifier 204 that amplifies an electrical signal from the integrating amplifier 203, a sample and hold circuit 205 that samples and holds the amplified electrical signal, and a buffer amplifier 206. The integrating amplifier 203 has an operational amplifier that amplifies a read electrical signal and that outputs the amplified signal, an integrating capacitor, and a reset switch. The amplification factor of the integrating amplifier 203 can be changed by changing the value of the integrating capacitor. The operational amplifier has an inverting input terminal to which an output electrical signal is input, a non-inverting input terminal to which a reference voltage Vref is input from a reference power supply 107b, and an output terminal from which an amplified electrical signal is output. The integrating capacitor is arranged between the inverting input terminal and the output terminal of the operational amplifier. Each of the sample and hold circuits 205 provided in correspondence with the amplifier circuits 207 is configured using a sampling switch and a sampling capacitor. The read circuit 103 further includes a multiplexer 208 that sequentially outputs electrical signals read in parallel from the individual amplifier circuits 207 as serial image signals, and a buffer amplifier 209 that performs impedance conversion on an image signal and that outputs the image signal. An image signal Vout output from the buffer amplifier 209, which is an analog electrical signal, is converted into digital image data by an analog-to-digital (A/D) converter 210 which is then output to the signal processing unit 105. Image data processed by the signal processing unit 105 is output to the control computer 108.

The drive circuit 102 outputs drive signals having a conductive voltage Vcom for bringing a switching element into a conductive state and a non-conductive voltage Vss for bringing a switching element into a non-conductive state in accordance with control signals (D-CLK, OE, DIO) input from the control unit 106 illustrated in FIG. 1 to an individual drive line. In response to the drive signals, the drive circuit 102 controls the conductive state and non-conductive state of the corresponding switching elements, and drives the detection unit 101.

Figure 2:
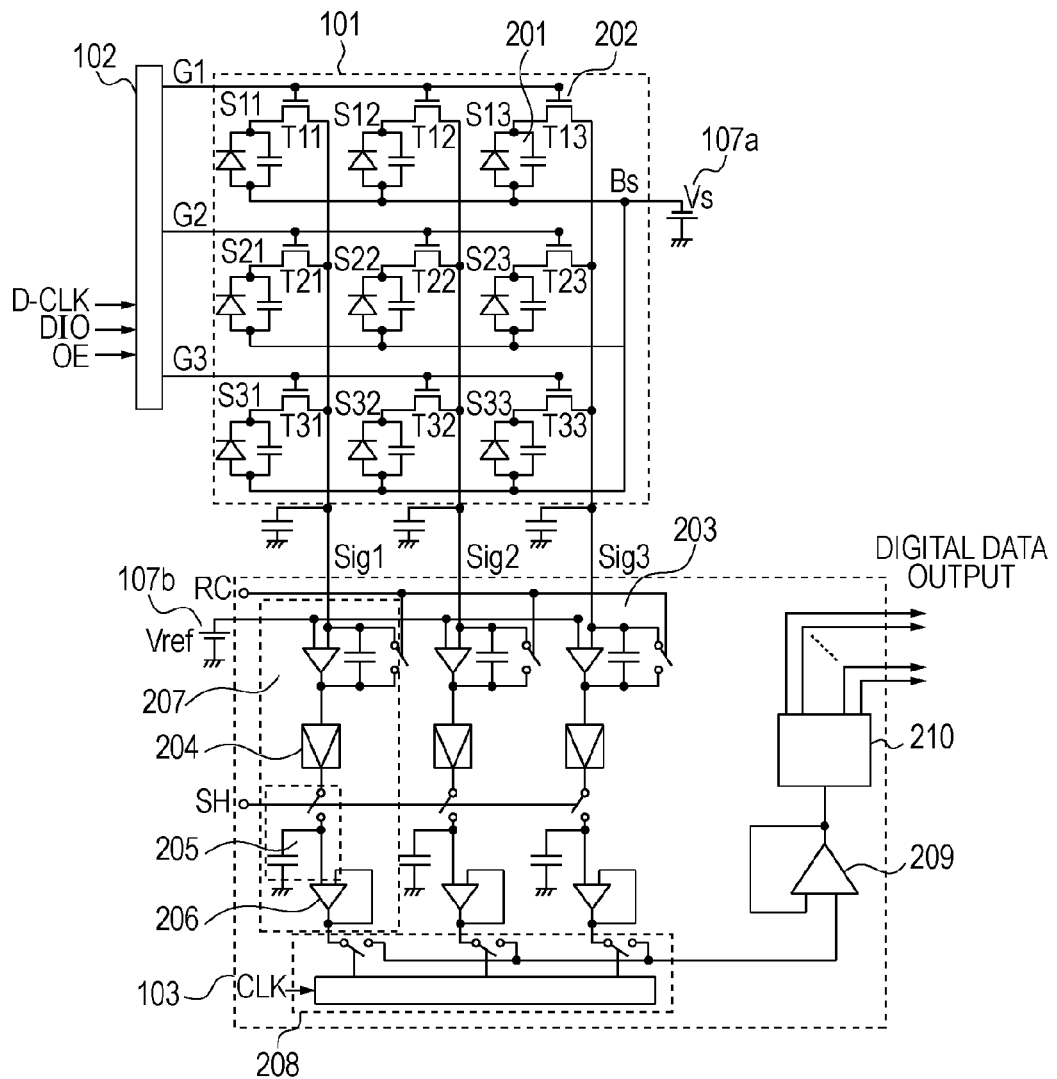
FIG. 2 is a conceptual equivalent circuit diagram of the imaging apparatus according to the present invention.

The power supply unit 107 illustrated in FIG. 1 includes the bias power supply 107a and the reference power supply 107b of the amplifier circuits 207, which are illustrated in FIG. 2. The bias power supply 107a commonly supplies a bias voltage Vs to the second electrodes of the conversion elements 201 via the bias line Bs. The bias voltage Vs corresponds to a first voltage in the present invention. The reference power supply 107b supplies the reference voltage Vref to the non-inverting input terminal of each operational amplifier.

In response to a control signal from a device outside the imaging apparatus 100, such as the control computer 108, via the signal processing unit 105, the control unit 106 illustrated in FIG. 1 controls the operation of the FPD 104 by supplying various control signals to the drive circuit 102, the power supply unit 107, and the read circuit 103. The control unit 106 controls the operation of the drive circuit 102 by supplying the control signals D-CLK, OE, and DIO to the drive circuit 102. Here, the control signal D-CLK may be a shift clock of a shift register used as a drive circuit, the control signal DIO may be a pulse transferred by the shift register, and the control signal OE may be adapted to control an output end of the shift register. Further, the control unit 106 controls the operation of the individual constituent elements of the read circuit 103 by supplying control signals RC, SH, and CLK to the read circuit 103. Here, the control signal RC may be adapted to control the operation of the reset switches of the integrating amplifiers, the control signal SH may be adapted to control the operation of the sample and hold circuits 205, and the control signal CLK may be adapted to control the operation of the multiplexer 208.

Figure 3:
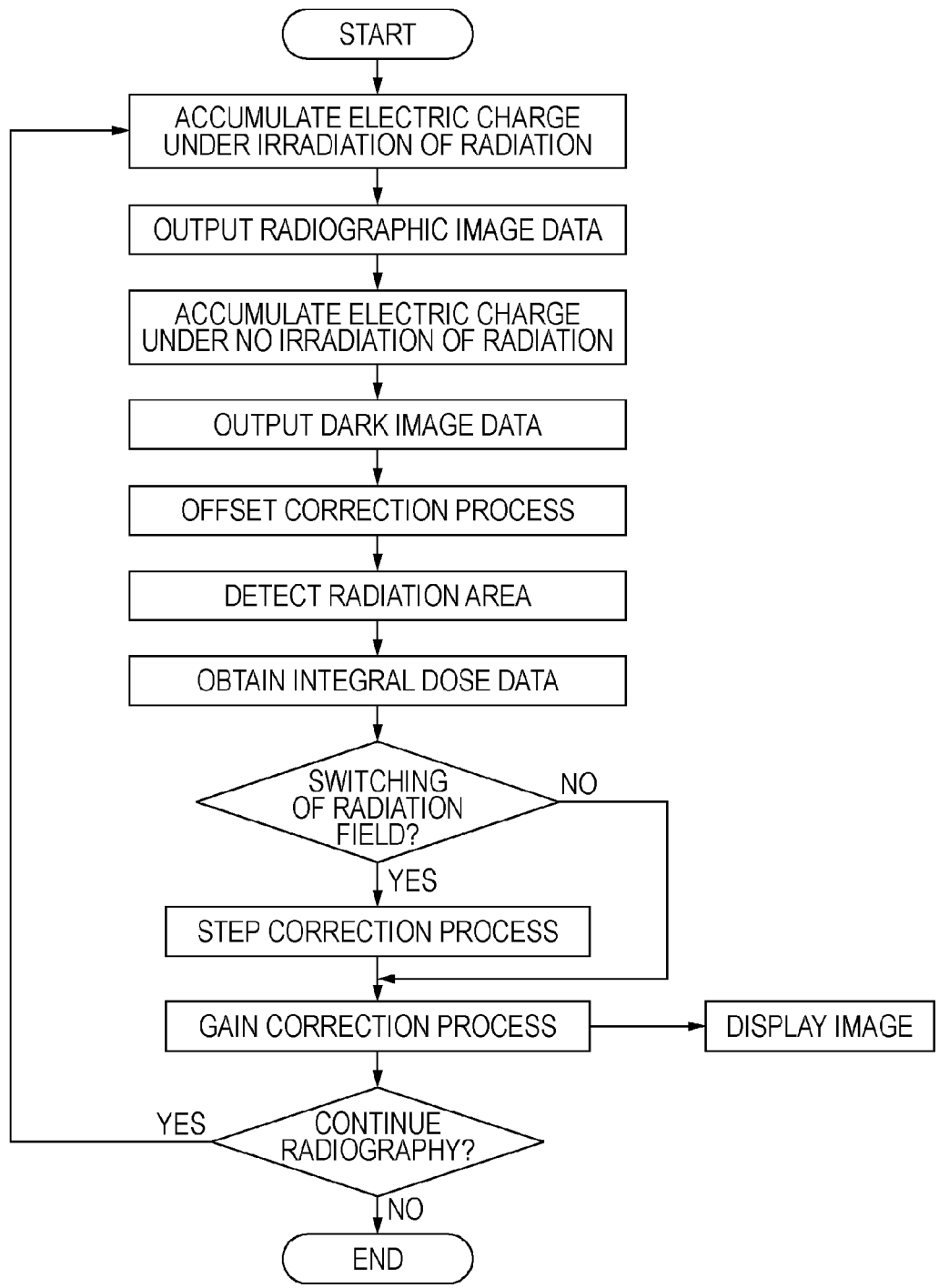
FIG. 3 is a flowchart illustrating the operation of the imaging apparatus and the imaging system according to the present invention.

Next, the overall operation of the imaging apparatus and the imaging system according to the present invention will be described with reference to FIGS. 1 to 3, particularly, FIG. 3. In accordance with an operation of the console 114 by an operator, the control computer 108 determines irradiation conditions and starts radiography. Radiation is applied to an object, as desired, under the irradiation conditions from the radiation generating device 110 which is controlled by the radiation control device 109, and the FPD 104 accumulates electric charge corresponding to the applied radiation transmitted through the object. The FPD 104 outputs image data corresponding to radiation or light in accordance with the accumulated electric charge. Then, the FPD 104 accumulates electric charge in the state where no radiation is applied, and outputs dark image data. The output image data is offset-corrected by the signal processing unit 105 using the output dark image data.

Then, the signal processing unit 105 detects a radiation area in the imaging apparatus 100 on the basis of the obtained dark image data. The signal processing unit 105 further obtains data relating to the integral dose on the basis of the obtained dark image data. The operation for detecting a radiation area and obtaining data relating to the integral dose will be described in detail below. Based on the obtained detection result of the radiation area, it is determined whether or not switching of the radiation field has been performed. If it is determined that switching of the radiation field has been performed (YES), a step correction process described in detail below is performed. In this case, the signal processing unit 105 performs the step correction process on the basis of the obtained integral dose data and detection result of the radiation area. If it is determined that switching of the radiation field has not been performed (NO), the step correction process is not performed and the process proceeds to a gain correction process. Even when a negative determination (NO) is obtained, the step correction process may be performed if it is determined that there is an image step as a result of the determination as to whether an image step is present. Further, even when an affirmative determination (YES) is obtained, the step correction process may not necessarily be performed if it is determined that there is no image step as a result of the determination as to whether an image step is present.

The control computer 108 outputs image data which has been subjected to various correction processes to the display device 113. Then, the control computer 108 prompts the operator to confirm whether to continue radiography. When the operator issues an instruction not to continue radiography (NO), the radiography ends. When the operator issues an instruction to continue radiography (YES), the radiography continues.

Figure 4A:
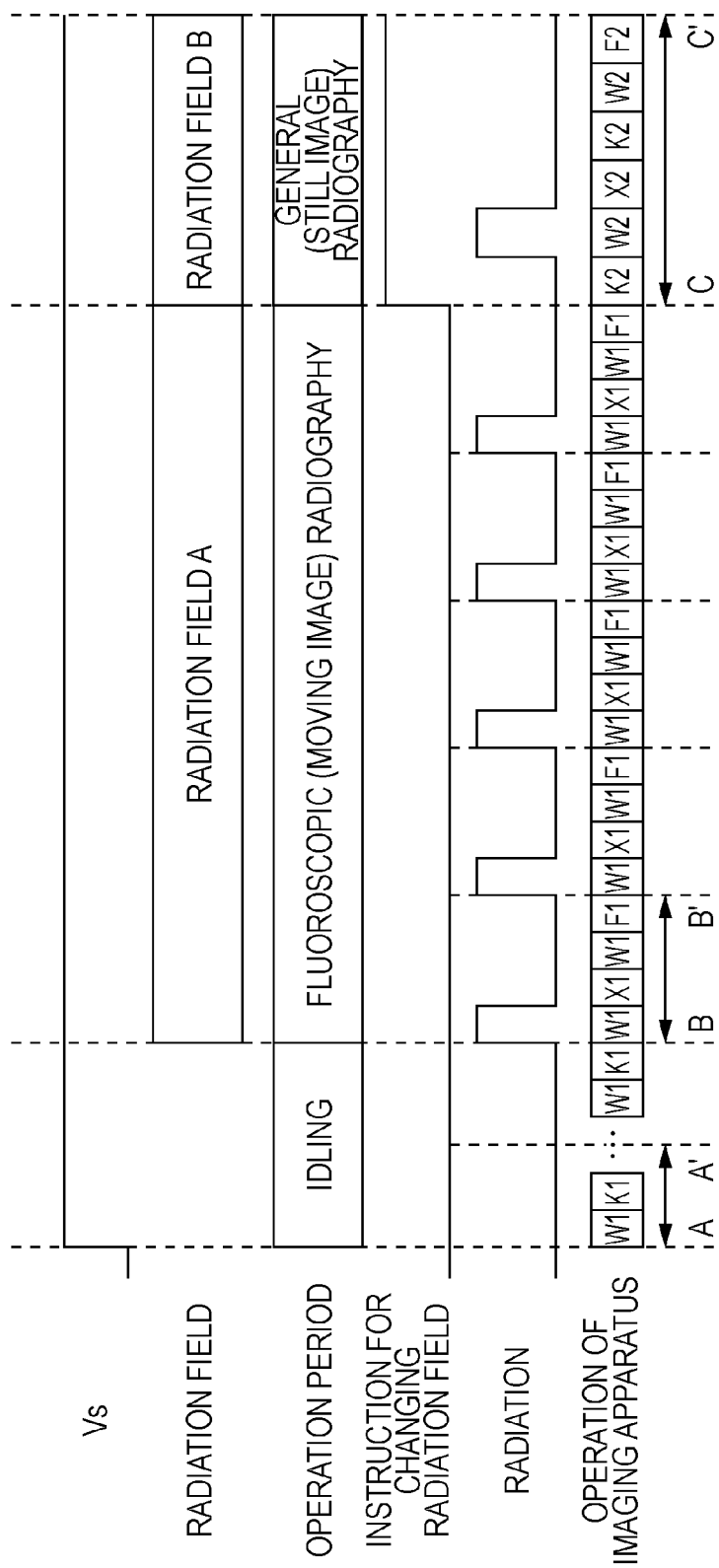
FIG. 4A is a timing chart illustrating the operation of the imaging apparatus and the imaging system according to the present invention.

The operation of the imaging system according to the present invention will now be described with reference to FIGS. 4A to 4D. In FIG. 4A, when the bias voltage Vs is supplied to the conversion elements 201, the imaging apparatus 100 performs an idling operation during an idling period. The term "idling operation", as used herein, means an operation for performing at least an initialization operation K1 repeatedly a plurality of times in order to stabilize the characteristic fluctuation of the FPD 104 which may be caused by the start of application of the bias voltage Vs. The term "initialization operation" means an operation for applying an initial bias before an accumulation operation to a conversion element and initializing the conversion element. In FIG. 4A, in the idling operation, a set of operations including an accumulation operation W1 and the initialization operation K1 is performed repeatedly a plurality of times.

Figure 4B:
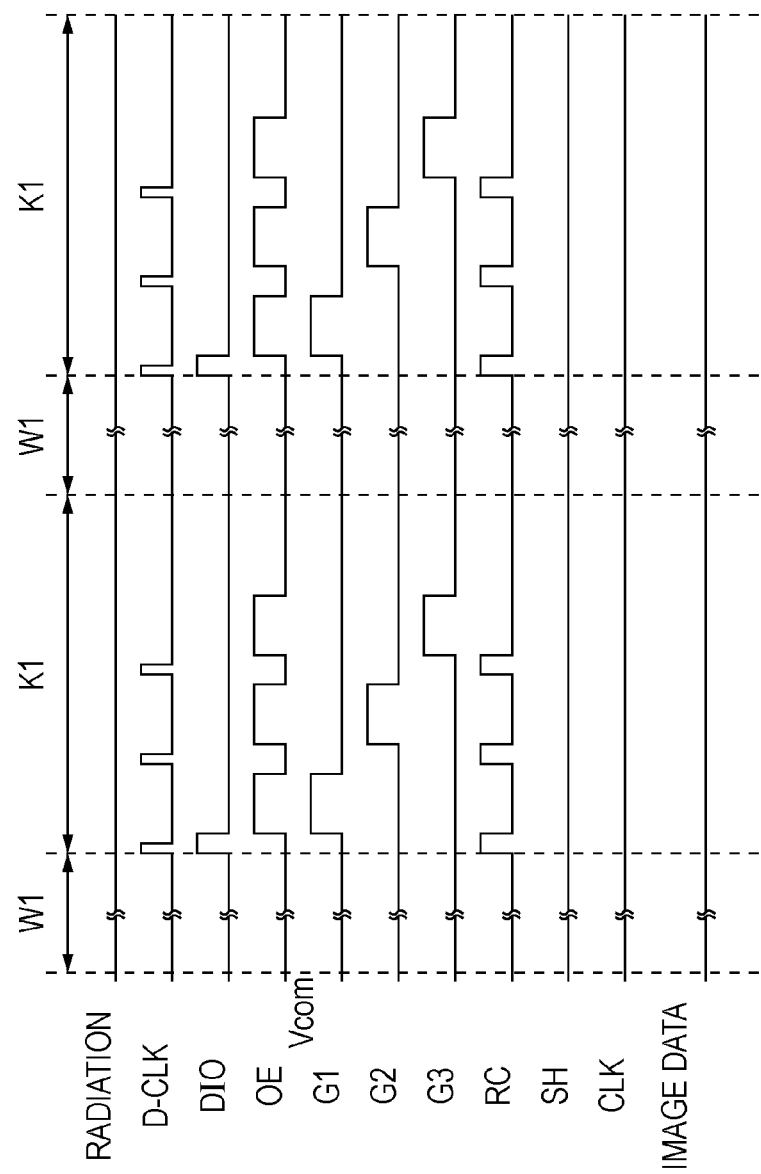
FIG. 4B is a timing chart illustrating the operation of the imaging apparatus and the imaging system according to the present invention.

FIG. 4B is a timing chart illustrating the operation of the imaging apparatus 100 during a period A-A' in FIG. 4A. As illustrated in FIG. 4B, in the accumulation operation W1, the non-conductive voltage Vss is applied to the switching elements 202 while the bias voltage Vs is applied to the conversion elements 201, and the switching elements of all the pixels are brought into a non-conductive state. In the initialization operation K1, first, the integrating capacitors of the integrating amplifiers 203 and the signal lines Sig1 to Sig3 are reset by the reset switches, and the conductive voltage Vcom is applied to the drive line G1 from the drive circuit 102 so that the switching elements T11, T12, and T13 of the pixels in the first row are brought into a conductive state. Due to the conductive state of the switching elements T11, T12, and T13, conversion elements S11, S12, and S13 are initialized. In this case, the electric charge of the conversion elements S11, S12, and S13 is output as electrical signals by the switching elements T11, T12, and T13. In the embodiment, since the circuits subsequent to the sample and hold circuits 205 are not rendered to operate, the data corresponding to the electrical signals is not output from the read circuit 103. Thereafter, the integrating capacitors and the signal lines Sig1 to Sig3 are reset again, and therefore the output electrical signals are processed. In this regard, in order to use the above data for correction or the like, the circuits subsequent to the sample and hold circuits 205 may be rendered to operate in a manner similar to that of the image output operation or dark image output operation described below. The above control of the conductive state of the switching elements and the above reset are repeatedly performed for the second and third rows, and therefore the initialization operation of the detection unit 101 is performed. Here, in the initialization operation, the reset switches may also be kept in a conductive state to continue the reset at least during the conductive state of the switching elements. Further, the conducting time of a switching element in the initialization operation may be shorter than the conducting time of a switching element in the image output operation described below. Further, in the initialization operation, switching elements in a plurality of rows may be brought into conduction at the same time. In the above cases, it is possible to reduce the time required for the overall initialization operation, and to more quickly stabilize the characteristic fluctuation of the detector. In the embodiment, the initialization operation K1 is performed during the same period as that of the image output operation included in the fluoroscopic radiography operation performed after the idling operation.

Figure 4C:
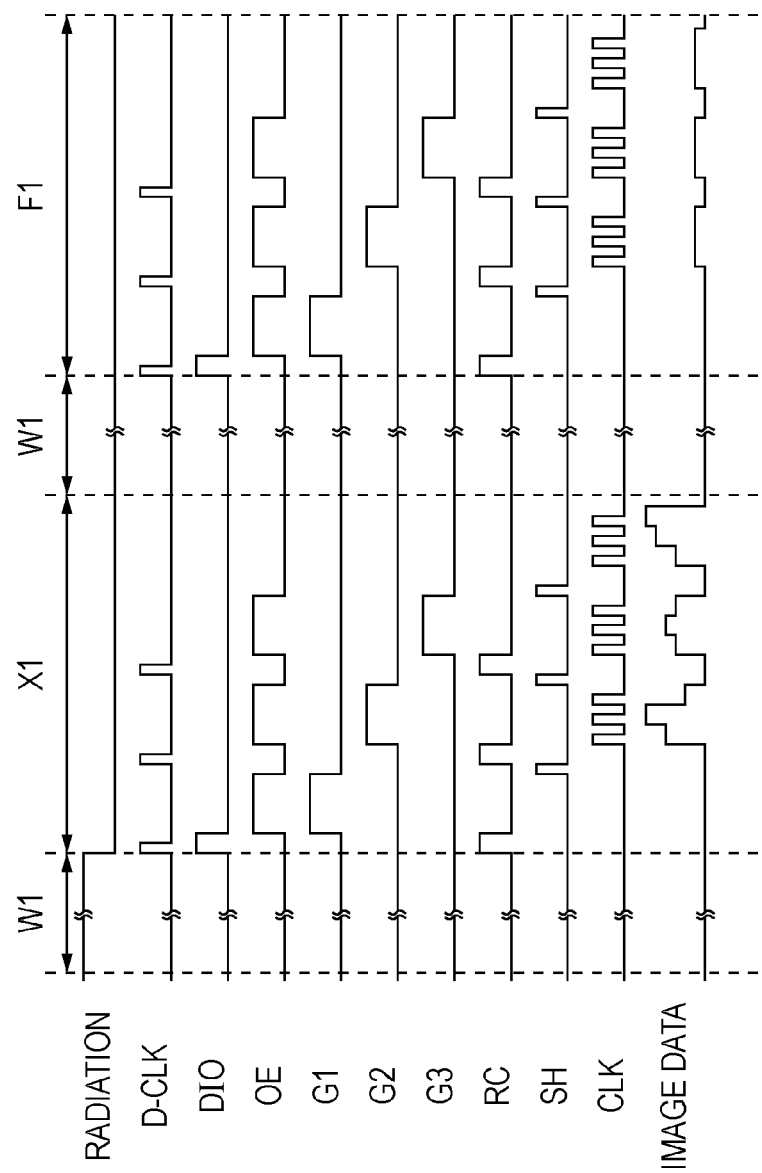
FIG. 4C is a timing chart illustrating the operation of the imaging apparatus and the imaging system according to the present invention.

FIG. 4C is a timing chart illustrating the operation of the imaging apparatus 100 during a period B-B' in FIG. 4A. After the idling operation is performed and the detection unit 101 is brought into a state where radiography is enabled, in response to a control signal from the control computer 108, the imaging apparatus 100 performs the fluoroscopic radiography operation for irradiating the FPD 104 with radiation in the area of the radiation field A. The fluoroscopic radiography operation corresponds to a first radiography operation in the present invention. The period during which the imaging apparatus 100 performs the fluoroscopic radiography operation is referred to as a "fluoroscopic radiography period". During the fluoroscopic radiography period, the imaging apparatus 100 performs the accumulation operation W1 that is performed during a period corresponding to the duration of irradiation with radiation so that the conversion elements 201 can generate electric charge in accordance with the applied radiation, and an image output operation X1 for outputting image data on the basis of the electric charge generated in the accumulation operation W1. As illustrated in FIG. 4C, in the image output operation X1, first, the integrating capacitors and the signal lines Sig1 to Sig3 are reset, and the conductive voltage Vcom is applied to the drive line G1 from the drive circuit 102 so that the switching elements T11, T12, and T13 in the first row are brought into a conductive state. Accordingly, electrical signals based on the electric charge generated by conversion elements S11, S12, and S13 in the first row are output to the signal lines Sig1 to Sig3. The electrical signals output in parallel to the signal lines Sig1 to Sig3 are amplified by the operational amplifiers 203 and the variable amplifiers 204 of the corresponding amplifier circuits 207. The sample and hold circuits 205 are rendered to operate in response to the control signal SH, and the amplified electrical signals are held in parallel in the sample and hold circuits 205 in the amplifier circuits 207. After the electrical signals are held, the integrating capacitors and the signal lines Sig1 to Sig3 are reset. After the resetting, the conductive voltage Vcom is applied to the drive line G2 in the second row in a manner similar to that in the first row so that switching elements T21, T22, and T23 in the second row are brought into a conductive state. During the period during which the switching elements T21, T22, and T23 in the second row are brought into a conductive state, the multiplexer 208 sequentially outputs the electrical signals held in the sample and hold circuits 205. Thus, the electrical signals from the pixels in the first row, which are read in parallel, are converted into serial image signals and are then output, and the A/D converter 210 performs conversion to produce image data for one row and then outputs the resulting image data. The above operation is performed for the first to third rows on a row-by-row basis, and therefore image data of one frame is output from the imaging apparatus 100. Further, in the embodiment, an accumulation operation W1 that is performed during the same period as that of the accumulation operation W1 so that the conversion elements 201 can generate electric charge in a dark state where radiation is not being applied, and a dark image output operation F1 for outputting dark image data on the basis of the electric charge generated in the accumulation operation W1 are performed. In the dark image output operation F1, an operation similar to the image output operation X1 is performed by the imaging apparatus 100.

Next, when the control computer 108 detects changing of the radiation field, the control computer 108 performs a step correction process in accordance with the detection. The step correction process will be described in detail below with reference to FIGS. 5A to 5C.

Figure 4D:
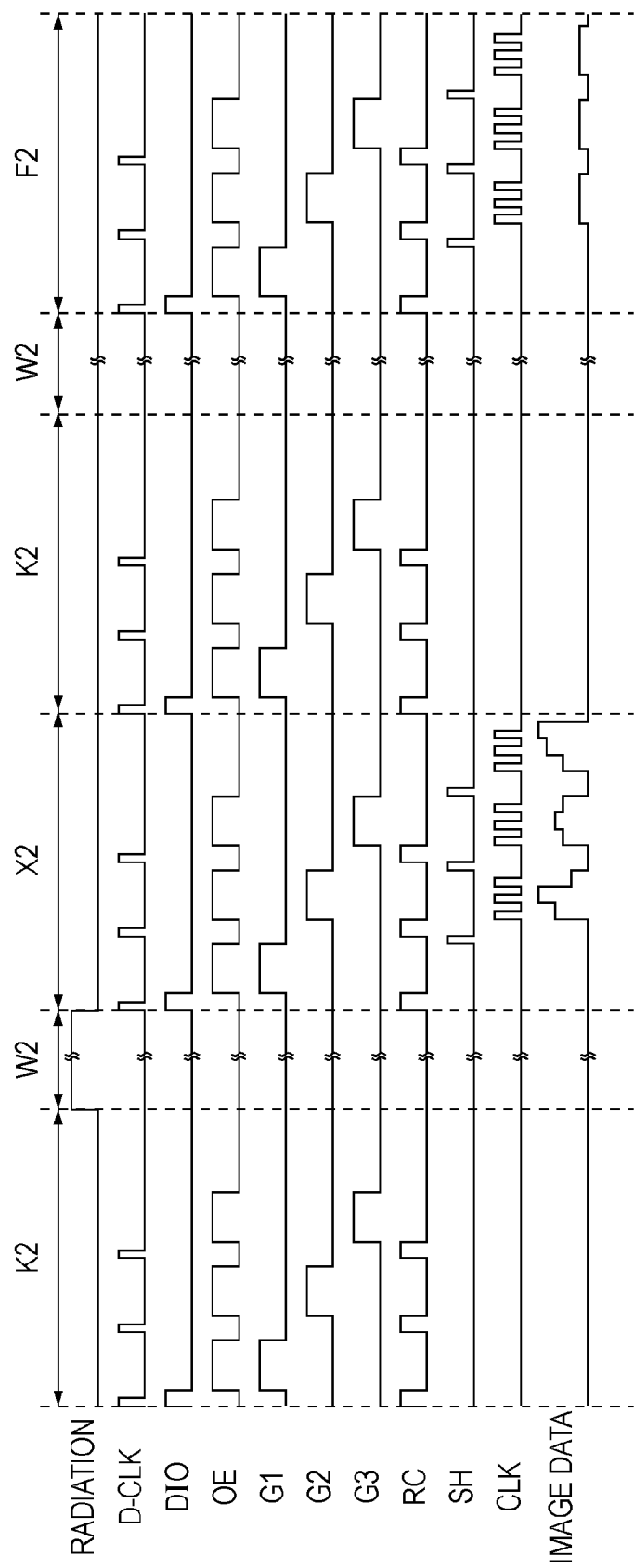
FIG. 4D is a timing chart illustrating the operation of the imaging apparatus and the imaging system according to the present invention.

FIG. 4D is a timing chart illustrating the operation of the imaging apparatus 100 during a period C-C' in FIG. 4A. In accordance with a control signal from the control computer 108, the imaging apparatus 100 performs a general (still image) radiography operation for irradiating the FPD 104 with radiation in the radiation field B that is an area larger than the radiation field A. The general radiography operation corresponds to a second radiography operation in the present invention. The period during which the imaging apparatus 100 performs the general radiography operation is referred to as a "general radiography period". During the general radiography period, the imaging apparatus 100 performs an accumulation operation W2 that is performed during an accumulation time Tw determined in the arithmetic processing so that a conversion element can generate electric charge in accordance with the applied radiation, and an image output operation X2 for outputting image data on the basis of the electric charge generated in the accumulation operation W2. As illustrated in FIG. 4D, in the embodiment, the accumulation operation W2 and the image output operation X2 are operations similar to the accumulation operation W1 and the image output operation X1, respectively. In the embodiment, the accumulation operations W1 and W2 are represented using different symbols because the periods during which the accumulation operations W1 and W2 are performed are different, and the image output operations X1 and X2 are represented using different symbols because the periods during which the image output operations X1 and X2 are performed are different. However, depending on the result of the arithmetic processing, the accumulation operations W1 and W2 may be performed during the same period and the image output operations X1 and X2 may be performed during the same period. Further, in the embodiment, an accumulation operation W2 that is performed during the same period as that of the accumulation operation W2 so that a conversion element can generate electric charge in a dark state where radiation is not being applied, and a dark image output operation F2 for outputting dark image data on the basis of the electric charge generated in the accumulation operation W2 are performed. In the dark image output operation F2, an operation similar to the image output operation X2 is performed by the imaging apparatus 100. In the embodiment, the imaging apparatus 100 further performs an initialization operation K2 prior to each of the accumulation operations W2. The initialization operation K2 is an operation similar to the initialization operation K1 described previously. In embodiment, the initialization operations K1 and K2 are represented using different symbols because the periods during which the initialization operations K1 and K2 are performed are different. However, as in the accumulation operations W1 and W2 described above, the initialization operations K1 and K2 may be performed during the same period depending on the result of the arithmetic processing.

Next, the step correction process of the control computer 108 according to the embodiment will be described with reference to FIGS. 5A to 5C and FIGS. 6A and 6B. In the embodiment, an area in the FPD 104 that is irradiated with radiation or light in the radiation field A referred to as a "first area", and an area other than the first area in the FPD 104 that is irradiated with radiation or light in the radiation field B is referred to as a "second area". Further, a pixel included in the first area is referred to as a "first pixel", and a pixel included in the second area is referred to as a "second pixel".

Figure 5A:
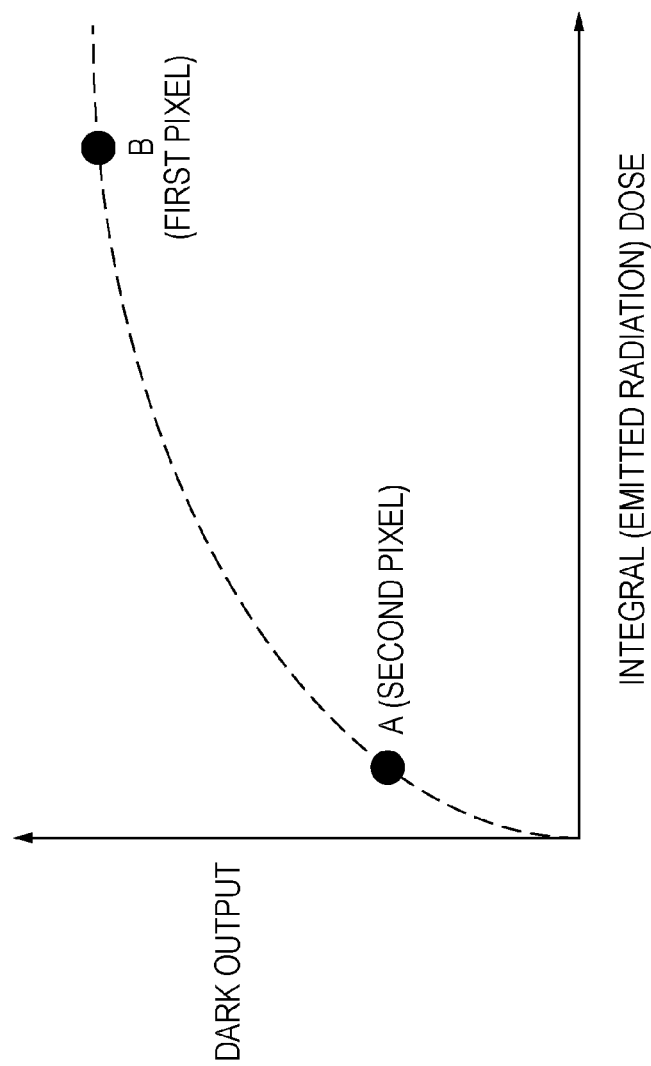
FIG. 5A is an integral dose versus dark output characteristic diagram describing a concept and advantages of the present invention.
Figure 5B:
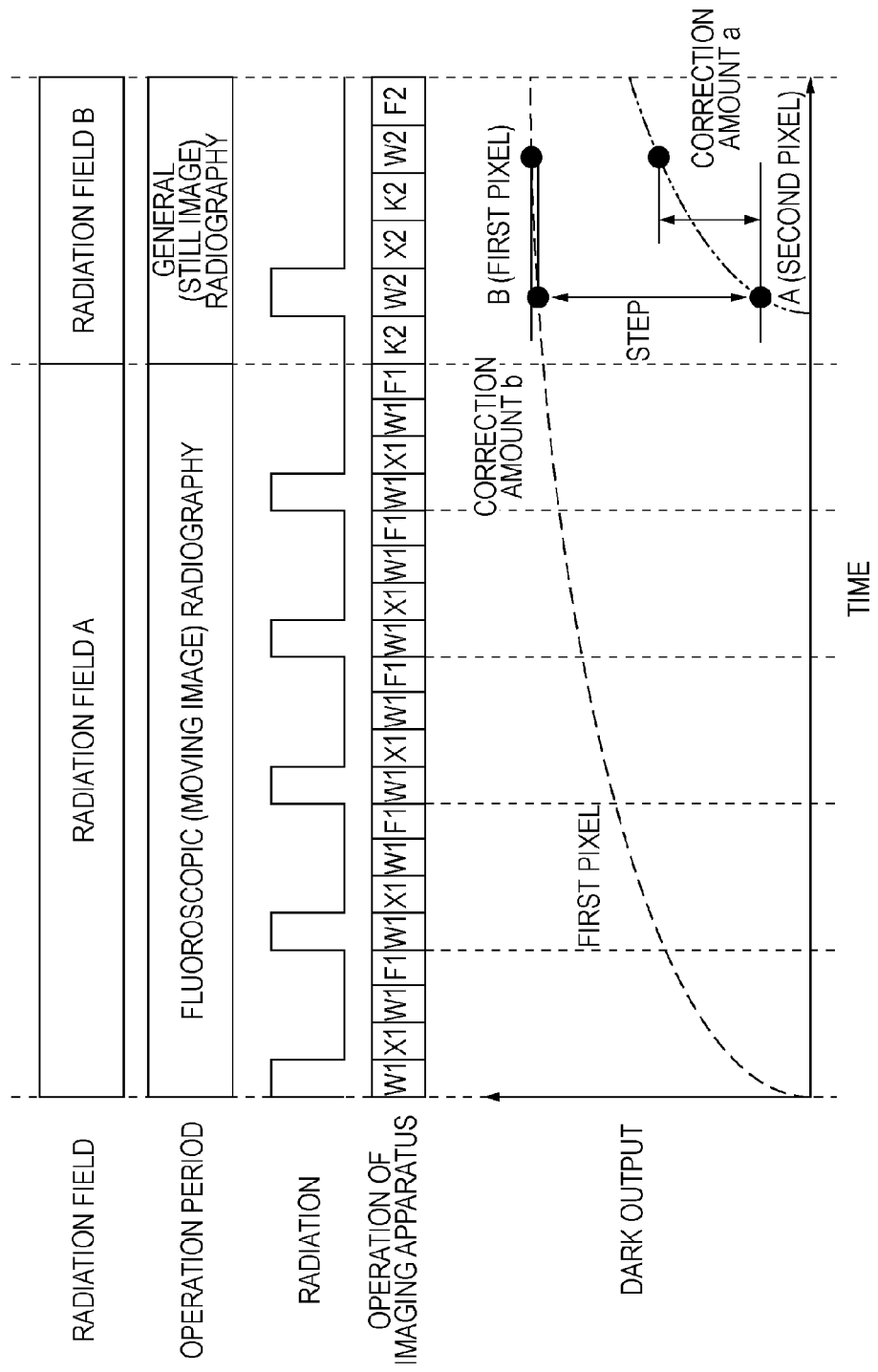
FIG. 5B is an integral dose versus dark output characteristic diagram describing the concept and advantages of the present invention.

First, a mechanism of the occurrence of an image step to be addressed in the arithmetic processing according to the present invention will be described with reference to FIGS. 5A to 5C. As illustrated in FIG. 5A, the inventor of the present invention has found that the dark output of a flat panel detector depends upon the history of irradiation with radiation or light, more specifically, depends upon the integral dose of radiation or light after a bias voltage is applied to a conversion element of the flat panel detector. In the embodiment, since a radiography operation is performed in the radiation field A, the dark output of the second pixel is represented by A in FIG. 5A, and the dark output of the first pixel is represented by B. Thus, for example, a difference may occur between the dark output A of the second pixel and the dark output B of the first pixel, and the difference in dark output may yield an image step. In particular, the longer the period of the fluoroscopic radiography operation is, the larger the difference in dark output between the first pixel and the second pixel is, resulting in a more noticeable step in the image. As illustrated in FIG. 5B, the inventor of the present invention has found that since the dark output of a flat panel detector depends upon the history of irradiation, a difference in dark output occurs between the irradiated area in the flat panel detector where radiation or light is applied and the non-irradiated area, thus causing an image step.

Therefore, the inventor of the present invention has found correction of image data based on dark output information that is based on the integral dose of the radiation or light and the dark output characteristics of the pixels, a first integral dose that is an integral dose for the first pixel, and a second integral dose that is an integral dose for the second pixel. The dark output information may be implemented using an integral dose versus dark output characteristic that exhibits the relationship as illustrated in FIG. 5A between the integral doses and the dark outputs of the pixels. The dark output of the first pixel is specified using the integral dose versus dark output characteristic in accordance with the first integral dose, and the dark output of the second pixel is specified using the integral dose versus dark output characteristic in accordance with the second integral dose. Within the image data, the data corresponding to the first pixel and the data corresponding to the second pixel are corrected using the values of the specified dark outputs. Therefore, the dark outputs included in the above pieces of data are appropriately reduced, and the difference in dark output between the first pixel and the second pixel is reduced, resulting in a less noticeable image step. In the above correction, the difference between the specified dark outputs may be determined first, and then correction may be performed on one of the data corresponding to the first pixel and the data corresponding to the second pixel.

Further, in order to achieve high-accuracy offset correction, it may be more effective that, as illustrated in FIG. 5B, dark image data is obtained after image data is obtained, and an offset correction process is performed using the obtained image data and dark image data. There is a difference between the dark output included in the image data and the dark output included in the dark image data, an the image data that has been subjected to the above offset correction process includes a component that requires correction caused by the difference (hereinafter referred to as a "correction amount"). As illustrated in FIGS. 5B and 5C, the correction amount may change depending on the integral dose of radiation or light or the time taken from the start of the emission of radiation. If the radiation field of the flat panel detector is changed, a difference in correction amount occurs between the irradiated area in the flat panel detector where radiation or light is applied and the non-irradiated area, thus causing an image step, which has been found by the inventor of the present invention.

Figure 5C:
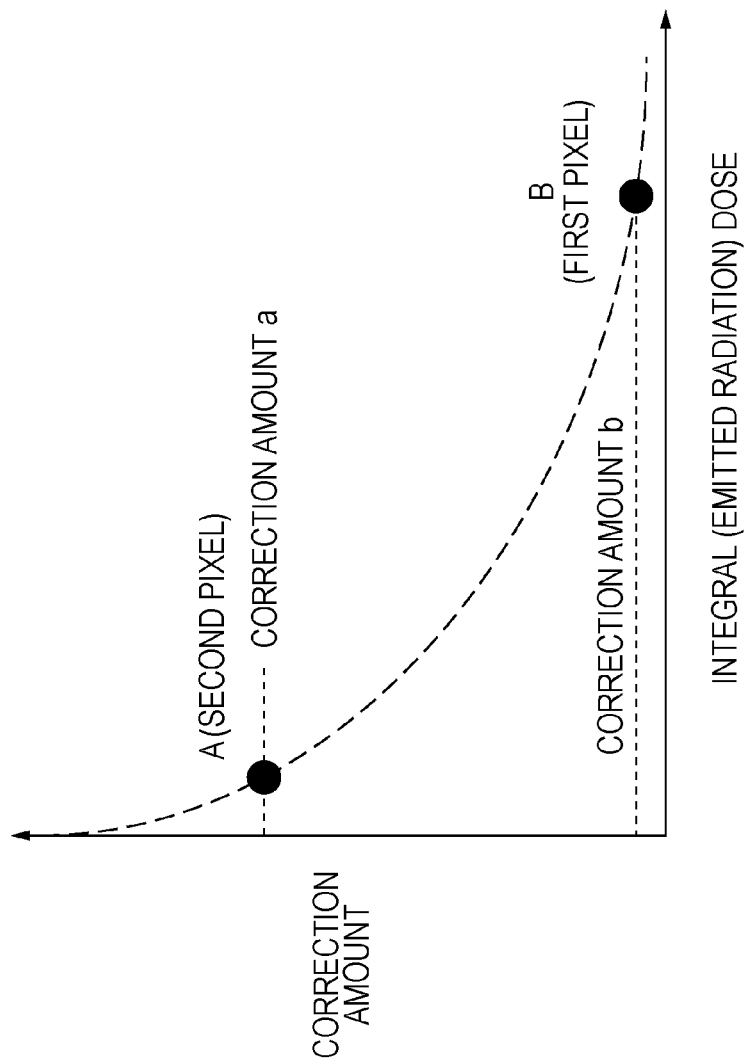
FIG. 5C is an integral dose versus dark output characteristic diagram describing the concept and advantages of the present invention.

In the above correction, therefore, the dark output information may be implemented using an integral dose versus correction amount characteristic that exhibits the relationship as illustrated in FIG. 5C between the integral doses and the correction amounts. The correction amount of the first pixel is specified using the integral dose versus correction amount characteristic in accordance with the first integral dose, and the correction amount of the second pixel is specified using the integral dose versus correction amount characteristic in accordance with the second integral dose. Within the image data, the data corresponding to the first pixel and the data corresponding to the second pixel are corrected using the values of the specified correction amounts. Therefore, the difference between the dark outputs included in the above pieces of data is appropriately reduced, and the difference in correction amount between the first pixel and the second pixel is reduced, resulting in a less noticeable image step. In the above correction, the difference between the specified correction amounts may be determined first, and then correction may be performed on one of the data corresponding to the first pixel and the data corresponding to the second pixel.

Next, an image processing unit 601 that performs a correction process according to the present invention will be described with reference to FIGS. 6A and 6B. While in FIG. 6A, the image processing unit 601 is included in the signal processing unit 105 illustrated in FIG. 1, the present invention is not limited to this configuration. An image processing unit according to the present invention may be included in the control computer 108 illustrated in FIG. 1.

Image data from the detector 104 is temporarily stored in an image data storage unit 603 included in a storage unit 602. Then, dark image data is obtained from the detector 104, and an offset correction unit 606 performs offset correction using the image data stored in the storage unit 602 and the dark image data. An area detection unit 608 detects, based on the offset-corrected image data, whether or not radiation or light is applied in the second area, thereby detecting a radiation area in the detector 104 where radiation or light is applied. It may be possible to determine the changing of the radiation field only by determining whether or not irradiation in the second area is present. For more reliable determination, it may also be detected whether or not the first area is irradiated with radiation or light. A radiation area may be detected by comparing the offset-corrected image data with a predetermined threshold and detecting, as a radiation area, an area having a data value larger than the threshold. A radiation area may also be detected by creating a differential value image from the offset-corrected image data, determining a peak value of the differential value image as a boundary of a radiation area, and detecting an area inside the boundary as a radiation area. Alternatively, control information about the radiation generating device 110 may be obtained from the control computer 108, and a radiation area may be detected based on the control information. The area detection unit 608 outputs radiation area information as a detection result. Examples of the radiation area information may include, but not be limited to, address data of the pixels at the four corners of the radiation area, a flag indicating a radiation area, and a flag indicating that the radiation area has been changed.

A measurement unit 607 measures an integral dose of applied radiation or light from the offset-corrected image data in accordance with the detection result of the area detection unit 608. Specifically, the measurement unit 607 measures the first integral dose that is an integral dose of radiation or light with which the first pixel included in the first area is irradiated, and the second integral dose that is an integral dose of radiation or light with which the second pixel included in the second area is irradiated. An integral dose is measured by integrating the doses for the individual frames. An integral dose may be measured based on a pixel-by-pixel measurement or may be measured using an average value in each area.

A determination unit 609 determines, based on the detection result of the area detection unit 608, whether or not changing from the first radiation field to the second radiation field has occurred. The determination may be performed, as desired, by comparing the radiation area information about the current frame with the radiation area information about the preceding frame or by directly using a flag indicating that changing of the radiation area has occurred if the flag is included as radiation area information. If the determination unit 609 determines that changing of the radiation field has occurred (YES), the determination unit 609 outputs the offset-corrected image data to a correction unit 610. If the determination unit 609 determines that changing of the radiation field has not occurred (NO), the offset-corrected image data is output to a gain correction unit 611 described below.

If the determination unit 609 determines that changing has occurred, the correction unit 610 obtains dark output information from a dark output information storage unit 604 included in the storage unit 602. The correction unit 610 also obtains the first and second integral doses measured by the measurement unit 607. Further, the correction unit 610 obtains information regarding the radiation area from the area detection unit 608. Based on the obtained information described above, the correction unit 610 corrects at least one of the data of the first pixel and the data of the second pixel within the offset-corrected image data. Specifically, the correction unit 610 performs an addition process or a subtraction process on the image data using the dark output information obtained from the dark output information storage unit 604.

The dark output information according to the embodiment may be based on the integral dose versus correction amount characteristic as illustrated in FIG. 5C, and the characteristic is represented using the following approximate expression:

Correction amount=alpha exp(beta)

where alpha denotes the dark output characteristic coefficient and beta denotes the integral dose.

Figures 6A, 6B:
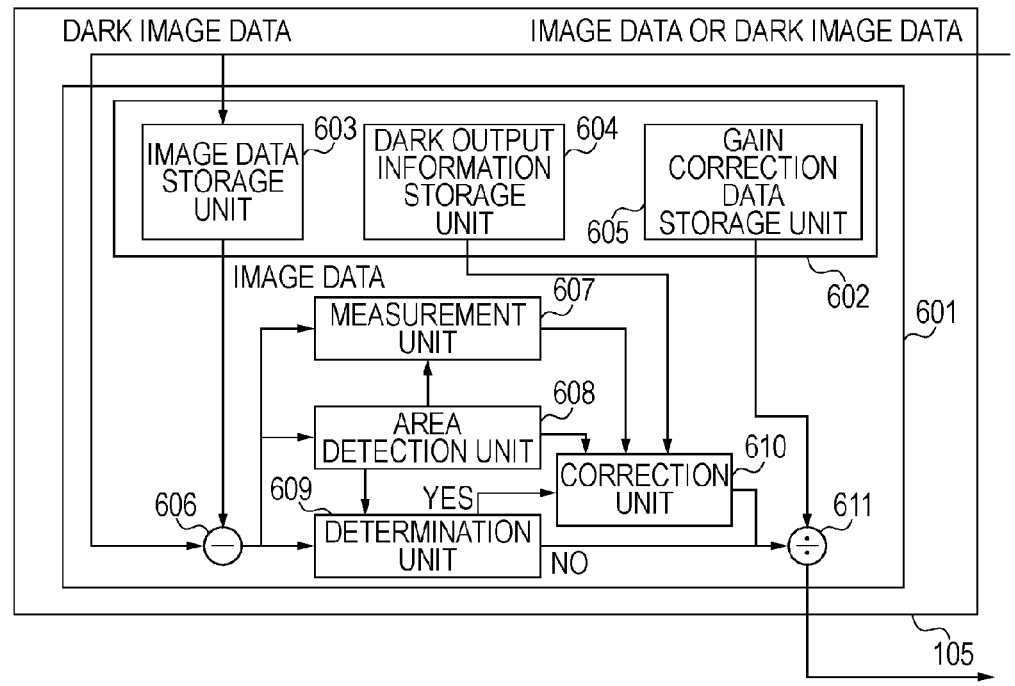
FIG. 6A is a block diagram illustrating an image processing unit configured to perform a correction process according to the present invention.
FIG. 6B is a lookup table of dark output information indicating integral doses and correction amounts.

The dark output information storage unit 604 obtains in advance dark output information using the above approximate expression or data measured in advance, and stores the dark output information as a lookup table illustrated in FIG. 6B. The dark output information may be prepared on a pixel-by-pixel basis, or may be applied to each pixel using the average value of all the pixels. Further, when the imaging apparatus 100 is capable of executing a plurality of different radiographic modes in which specific frame rates can be selected, such as general radiography and fluoroscopic radiography, dark output information may be prepared for each frame rate. Dark output information may be obtained in advance before shipment from factory or during product inspection, and may be stored in the dark output information storage unit 604.

Thereafter, the image data is subjected to gain correction by the gain correction unit 611 using gain correction data stored in a gain correction data storage unit 605 included in the storage unit 602. After correction processes are performed, the resulting corrected image data is output from the signal processing unit 105 to the control computer 108.

The above correction processes can reduce ghosting (image step) affected by a radiation area, and can address changing of a radiation area without significantly reducing image quality. Furthermore, since the correction processes are performed based on data obtained through a radiography operation similar to a normal radiography operation, there is no need for special operations to obtain corrected data in order to address switching of the radiation field. Therefore, an imaging apparatus and system that require only a short time for switching of the radiation field can be provided.

Second Embodiment

Figure 7:
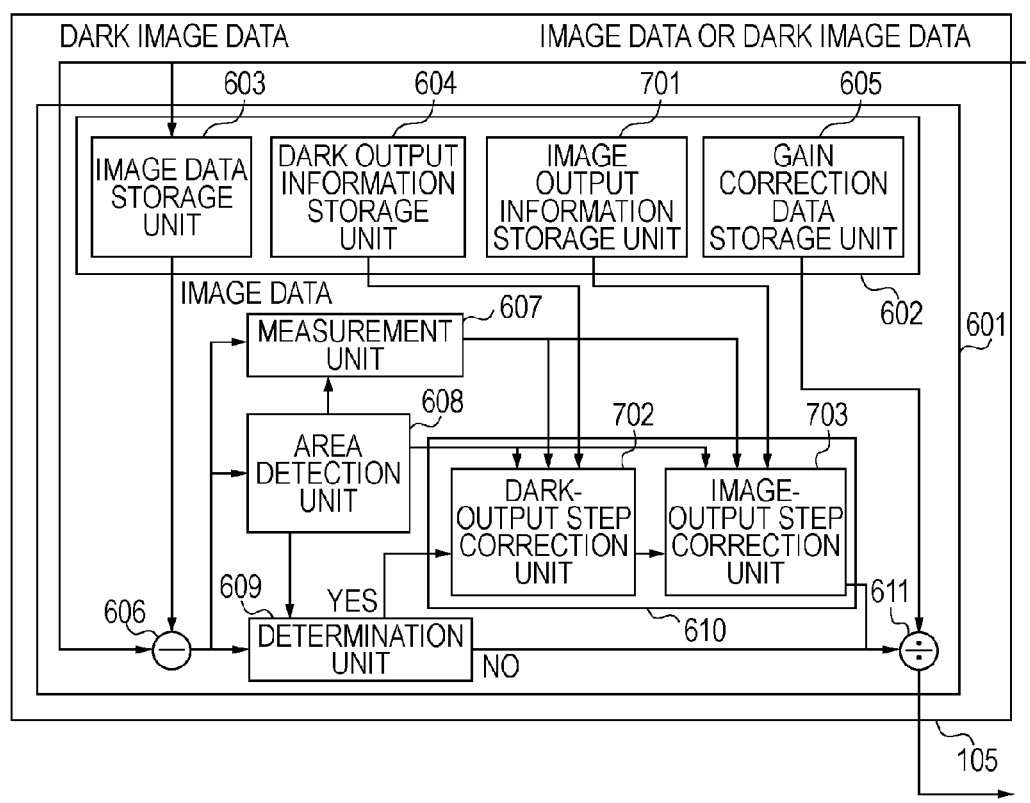
FIG. 7 is a block diagram illustrating an image processing unit configured to perform a correction process according to a second embodiment of the present invention.

Next, an image processing unit that performs a correction process according to a second embodiment of the present invention will be described with reference to FIG. 7. In the first embodiment, a step correction process is performed using dark output information. In the second embodiment, in contrast, a step correction process is performed further using image output information that is based on the integral dose of radiation or light and image (sensitivity) output characteristics of pixels. Other configuration and operation are similar to those in the first embodiment. In the following, a description will be given in detail of the difference from the first embodiment. Elements having configurations similar to those in the first embodiment are assigned the same numerals, and the detailed descriptions thereof are omitted.

In the embodiment, the storage unit 602 further includes a image output information storage unit 701. Image output information stored in the image output information storage unit 701 will be described in detail below. In the embodiment, furthermore, the correction unit 610 includes a dark-output step correction unit 702 and a image-output step correction unit 703, and may be configured to perform, as a step correction process, an addition or subtraction process using dark output information and a division process using image output information. The image-output step correction unit 703 performs the addition or subtraction process, which may be performed by the correction unit 610 in the first embodiment. The image-output step correction unit 703 obtains image output information from the image output information storage unit 701. The image-output step correction unit 703 further obtains the first and second integral doses measured by the measurement unit 607. Further, the image-output step correction unit 703 obtains information regarding the radiation area from the area detection unit 608. Based on the obtained information described above, the image-output step correction unit 703 corrects at least one of the data of the first pixel and the data of the second pixel within the image data corrected by the dark-output step correction unit 702. Specifically, the image-output step correction unit 703 performs a division process on the corrected image data using the image output information obtained from the image output information storage unit 701.

Figure 8B:
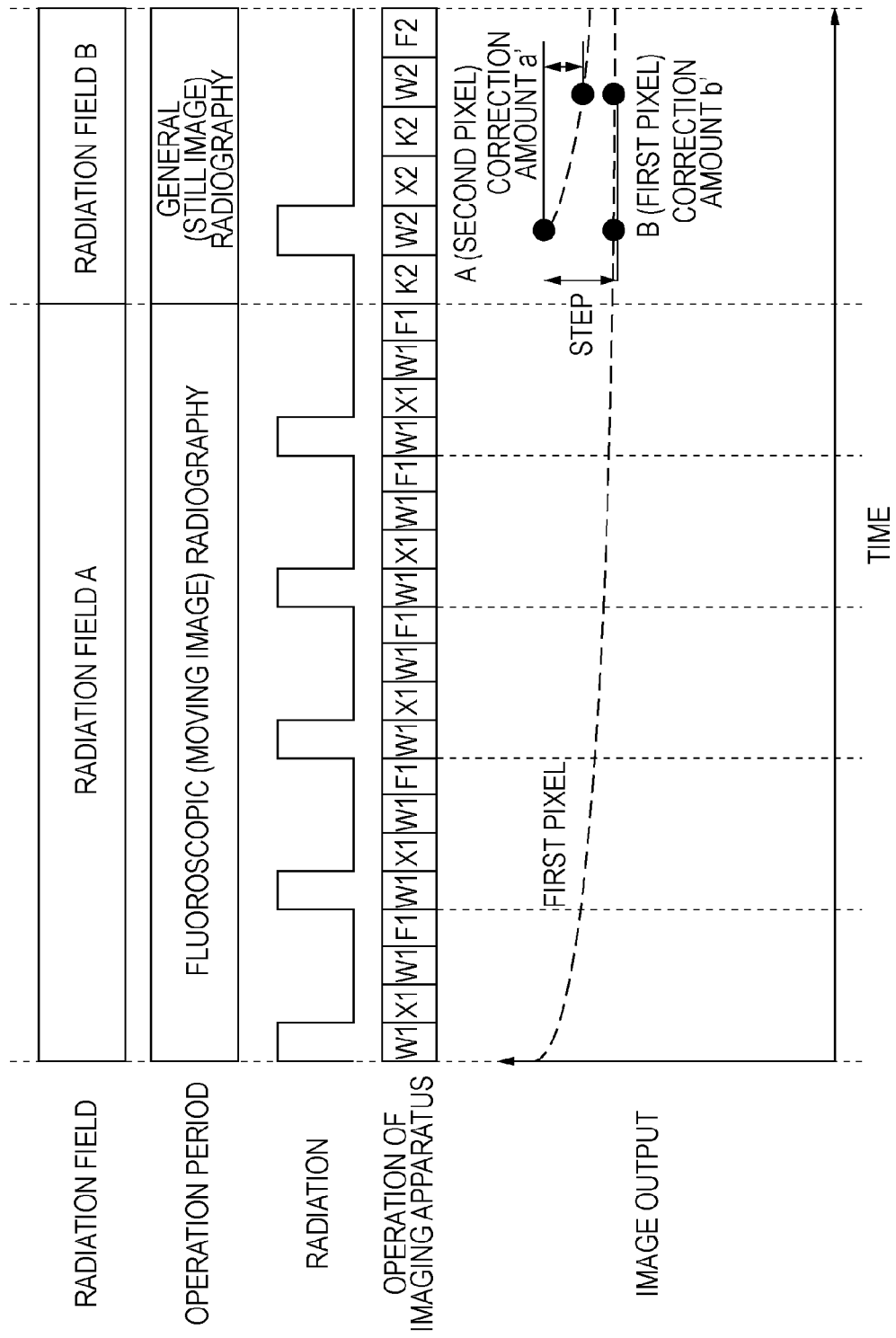
FIG. 8B is an integral dose versus image output characteristic diagram describing the other concept and advantages of the present invention.
Figure 8C:
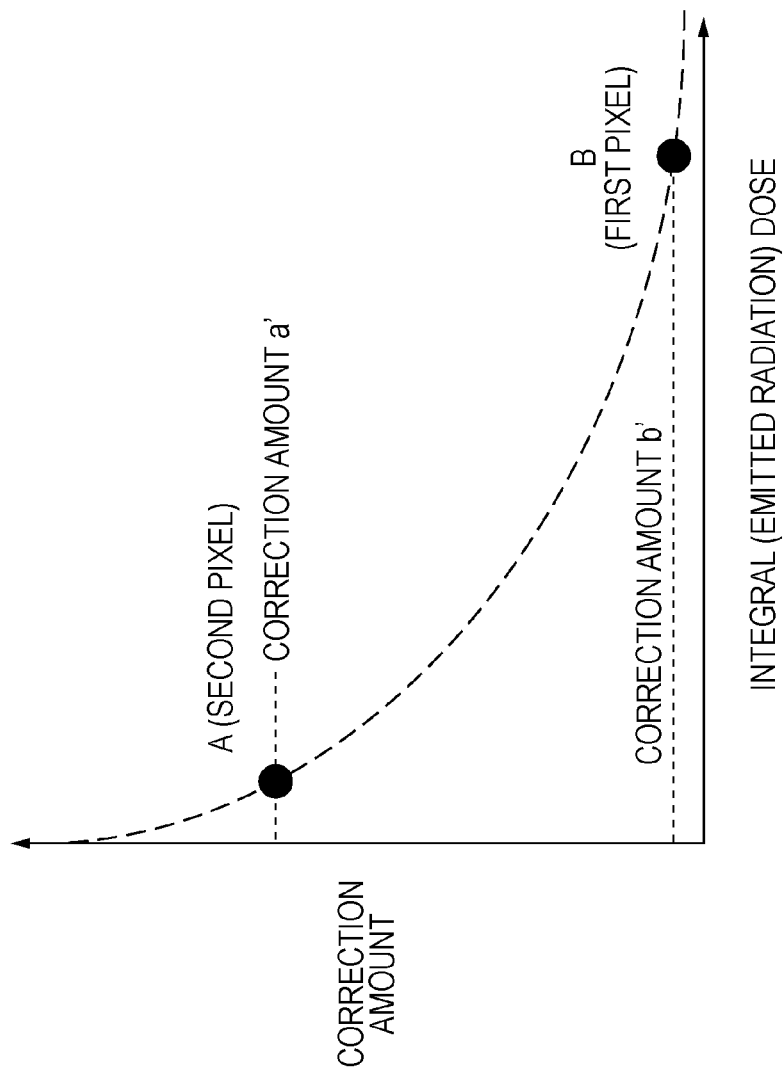
FIG. 8C is an integral dose versus image output characteristic diagram describing the other concept and advantages of the present invention.

Next, another mechanism of the occurrence of an image step to be addressed in the arithmetic processing according to the embodiment will be described with reference to FIGS. 8A to 8C. As illustrated in FIG. 8A, the inventor of the present invention has found that the image output of a flat panel detector depends upon the history of irradiation with radiation or light, more specifically, depends upon the integral dose of radiation or light after a bias voltage is applied to a conversion element of the flat panel detector. In the embodiment, since a radiography operation is performed in the radiation field A, the image output of the second pixel is represented by A in FIG. 8A, and the image output of the first pixel is represented by B. Thus, for example, a difference may occur between the image outputs A and B, and may yield an image step. In particular, the longer the period of the fluoroscopic radiography operation is, the larger the difference in image output between the first pixel and the second pixel is, resulting in a more noticeable step in the image. As illustrated in FIG. 8B, the inventor of the present invention has found that a difference in image output occurs between the irradiated area in the flat panel detector where radiation or light is applied and the non-irradiated area, thus causing an image step.

Therefore, the inventor of the present invention has found correction of image data based on image output information that is based on the integral dose of the radiation or light and the image output characteristics of the pixels, a first integral dose that is an integral dose for the first pixel, and a second integral dose that is an integral dose for the second pixel. The image output information may be implemented using an integral dose versus image output characteristic that exhibits the relationship as illustrated in FIG. 8A between the integral doses and the image outputs of the pixels. The image output of the first pixel is specified using the integral dose versus image output characteristic in accordance with the first integral dose, and the image output of the second pixel is specified using the integral dose versus image output characteristic in accordance with the second integral dose. Within the image data, the data corresponding to the first pixel and the data corresponding to the second pixel are corrected using the values of the specified image outputs. Therefore, the image outputs included in the above pieces of data are appropriately reduced, and the difference in image output between the first pixel and the second pixel is reduced, resulting in a less noticeable image step. In the above correction, the difference between the specified image outputs may be determined first, and then correction may be performed on one of the data corresponding to the first pixel and the data corresponding to the second pixel. In the above correction, the image output information may be implemented using an integral dose versus correction amount characteristic that exhibits the relationship as illustrated in FIG. 8C between the integral doses and the correction amounts. The correction amount of the first pixel is specified using the integral dose versus correction amount characteristic in accordance with the first integral dose, and the correction amount of the second pixel is specified using the integral dose versus correction amount characteristic in accordance with the second integral dose. Within the image data, the data corresponding to the first pixel and the data corresponding to the second pixel are corrected using the values of the specified correction amounts. Therefore, the difference between the image outputs included in the above pieces of data is appropriately reduced, and the difference in correction amount between the first pixel and the second pixel is reduced, resulting in a less noticeable image step. In the above correction, the difference between the specified correction amounts may be determined first, and then correction may be performed on one of the data corresponding to the first pixel and the data corresponding to the second pixel. The image output information is stored in the image output information storage unit 701 as a lookup table in a manner similar to that for the dark output information. The image output information may be prepared on a pixel-by-pixel basis, or may be applied to each pixel using the average value of all the pixels. Further, when the imaging apparatus 100 is capable of executing a plurality of different radiographic modes in which specific frame rates can be selected, such as general radiography and fluoroscopic radiography, image output information may be prepared for each frame rate. The step correction with the further use of image output information can more accurately reduce the occurrence of image steps.

The embodiments of the present invention can also be implemented by executing a program by, for example, a computer included in the signal processing unit 105 or the control computer 108. Further, a medium for supplying the program to the computer, for example, a computer-readable recording medium on which the program is recorded, such as a compact disc read only memory (CD-ROM), or a transmission medium through which the program is transmitted, such as the Internet, may also constitute an embodiment of the present invention. Further, the above program may also constitute an embodiment of the present invention. The above program, recording medium, transmission medium, and program product may fall within the scope of the present invention. Further, an embodiment including a combination of features that can be easily contemplated based on the first or second embodiments may also fall within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-195698 filed Aug. 26, 2009, which is hereby incorporated by reference herein in its entirety.

The invention claimed is:

1. A radiographic imaging system comprising:
   a detector including a plurality of pixels each having a conversion element configured to convert radiation or light into electric charge, the detector being configured to output image data corresponding to irradiated radiation or light, the detector having a first area where irradiation occurs in a first radiation field, and a second area other than the first area where irradiation occurs in a second radiation field larger than the first radiation field; and
   an image processing unit configured to perform image processing on the image data, wherein the image processing unit includes a storage unit configured to store dark output information that is based on an integral dose of the radiation or light and dark output characteristics of the pixels, a measurement unit configured to measure a first integral dose and a second integral dose, the first integral dose being an integral dose of radiation or light with which a first pixel included in the first area is irradiated, the second integral dose being an integral dose of radiation or light with which a second pixel included in the second area is irradiated, and a correction unit configured to correct, based on the dark output information obtained from the storage unit and the first integral dose and second integral dose measured by the measurement unit, at least one of data of the first pixel and data of the second pixel within the image data when switching from the first radiation field to the second radiation field has occurred.

2. The imaging system according to claim 1, wherein the storage unit further stores image output information that is based on an integral dose of the radiation or light and image output characteristics of the pixels, and
   wherein the correction unit further corrects, based on the image output information obtained from the storage unit and the first integral dose and second integral dose measured by the measurement unit, data corrected based on the dark output information, the first integral dose, and the second integral dose.

3. The imaging system according to claim 1, further comprising:
   an area detection unit configured to detect whether or not the radiation or light is applied in at least the second area; and
   a determination unit configured to determine, based on a detection result of the area detection unit, whether or not changing from the first radiation field to the second radiation field has occurred.

4. The imaging system according to claim 1, wherein the dark output information includes a characteristic indicating a relationship between an integral dose of the radiation or light and dark outputs of the pixels.

5. The imaging system according to claim 1, wherein the dark output information includes a characteristic indicating a relationship between an integral dose of the radiation or light and a correction amount caused by a difference between a dark output included in the image data and a dark output included in the dark image data, and wherein the image processing unit performs an offset correction process using the image data and dark image data, the dark image data being output from the detector under a dark condition where the detector is not being irradiated with the radiation or light, and, when changing from the first radiation field to the second radiation field has occurred, the image processing unit corrects at least one of data of the first pixel and data of the second pixel within offset-corrected image data produced by the offset correction process, based on the dark output information, the first integral dose, and the second integral dose.

6. An image processing method for performing image processing on image data corresponding to irradiated radiation or light, the image data being output from a detector including a plurality of pixels each having a conversion element configured to convert radiation or light into electric charge, the image processing method comprising the steps of:

measuring a first integral dose and a second integral dose, the first integral dose being an integral dose of radiation or light with which a first pixel included in a first area is irradiated, the first area being an area in the detector where the radiation or light is applied in a first radiation field, the second integral dose being an integral dose of radiation or light with which a second pixel included in a second area is irradiated, the second area being an area other than the first area in the detector where the radiation or light is irradiated in a second radiation field larger than the first radiation field; and when switching from the first radiation field to the second radiation field has occurred, correcting at least one of data of the first pixel and data of the second pixel within the image data, based on an integral dose of the radiation or light, dark output information that is obtained in advance and that is based on dark output characteristics of the pixels, and the measured first integral dose and second integral dose.

7. A non-transitory computer-readable medium having stored thereon a program for causing a computer to execute image processing on image data corresponding to irradiated radiation or light, the image data being output from a detector including a plurality of pixels each having a conversion element configured to convert radiation or light into electric charge, the program causing the computer to execute the steps of:

measuring a first integral dose and a second integral dose, the first integral dose being an integral dose of radiation or light with which a first pixel included in a first area is irradiated, the first area being an area in the detector where the radiation or light is applied in a first radiation field, the second integral dose being an integral dose of radiation or light with which a second pixel included in a second area is irradiated, the second area being an area other than the first area in the detector where the radiation or light is irradiated in a second radiation field larger than the first radiation field; and when switching from the first radiation field to the second radiation field has occurred, correcting at least one of data of the first pixel and data of the second pixel within the image data, based on an integral dose of the radiation or light, dark output information that is obtained in advance and that is based on dark output characteristics of the pixels, and the measured first integral dose and second integral dose.

* * * * *